United States Patent [19]

Yamada

[11] Patent Number: 5,119,659
[45] Date of Patent: Jun. 9, 1992

[54] DEVICE FOR CHANGING STROKE OF CAULKING MACHINE

[75] Inventor: Minoru Yamada, Osaka, Japan

[73] Assignee: Yoshikawa Iron Works Ltd., Shijyonawate, Japan

[21] Appl. No.: 708,275

[22] Filed: May 31, 1991

[51] Int. Cl.$^5$ ............................................. B21J 15/12
[52] U.S. Cl. ........................................ 72/115; 72/67; 72/406; 408/14
[58] Field of Search ............... 72/67, 112, 115, 125, 72/406; 408/241 S, 14; 409/184, 218

[56] References Cited

U.S. PATENT DOCUMENTS

| | | | |
|---|---|---|---|
| 3,589,219 | 6/1971 | Parsons | 408/14 |
| 3,724,964 | 4/1973 | Needham, Jr. | 408/14 |
| 4,308,738 | 1/1982 | Yoshida | 72/406 |
| 4,436,462 | 3/1984 | Martinez | 408/14 |
| 4,813,822 | 3/1989 | Biek | 408/14 |

FOREIGN PATENT DOCUMENTS

| | | | |
|---|---|---|---|
| 1253697 | 8/1986 | U.S.S.R. | 72/67 |
| 1530323 | 12/1989 | U.S.S.R. | 72/67 |

*Primary Examiner*—David Jones
*Attorney, Agent, or Firm*—Nikaido, Marmelstein, Murray & Oram

[57] ABSTRACT

A device for changing the stroke of a caulking machine having a table on which is placed an article having a plurality of rivet shanks, and a rivet head forming tool. The table is adapted to be moved back and forth and right and left to bring the rivet shanks into the position right under the rivet head forming tool one after another. The rivet head forming tool is driven by a motor and moved up and down by a cylinder to form a rivet head at the top of each rivet shank. The device for changing stroke has a plate member movable up and down together with the rivet head forming tool and stopper pins having their top ends secured to the plate member. An annular plate is mounted outside a rotary shaft of the rivet head forming tool so as to be freely rotatable at a predetermined position. A plurality of pins having lengths corresponding to the lengths of the rivet shanks of the article are secured at equal intervals to the annular plate to extend upright. The pins are adapted to be brought into abutment at the top ends thereof with the bottom ends of the stopper pins to restrict the down stroke of the rivet head forming tool.

3 Claims, 3 Drawing Sheets

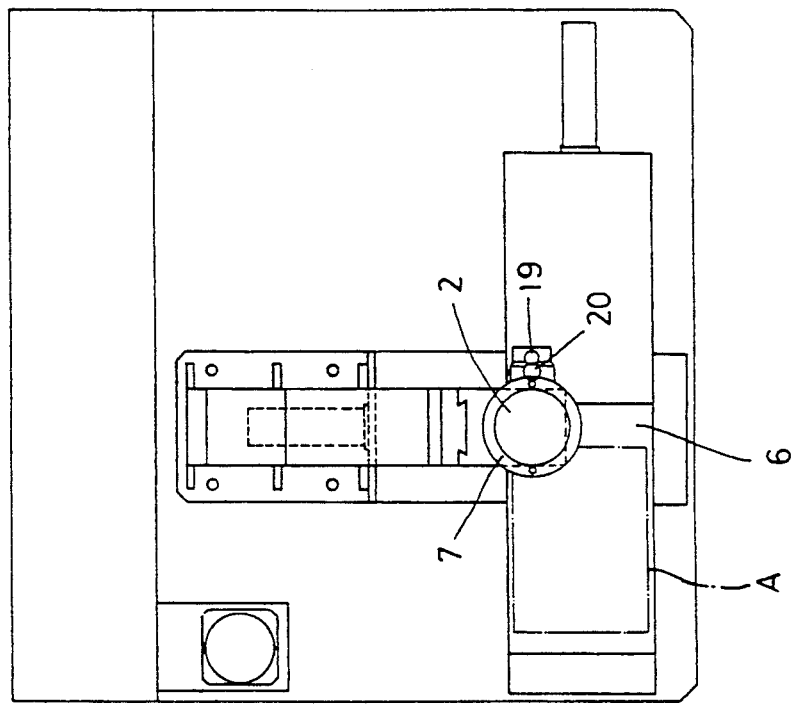
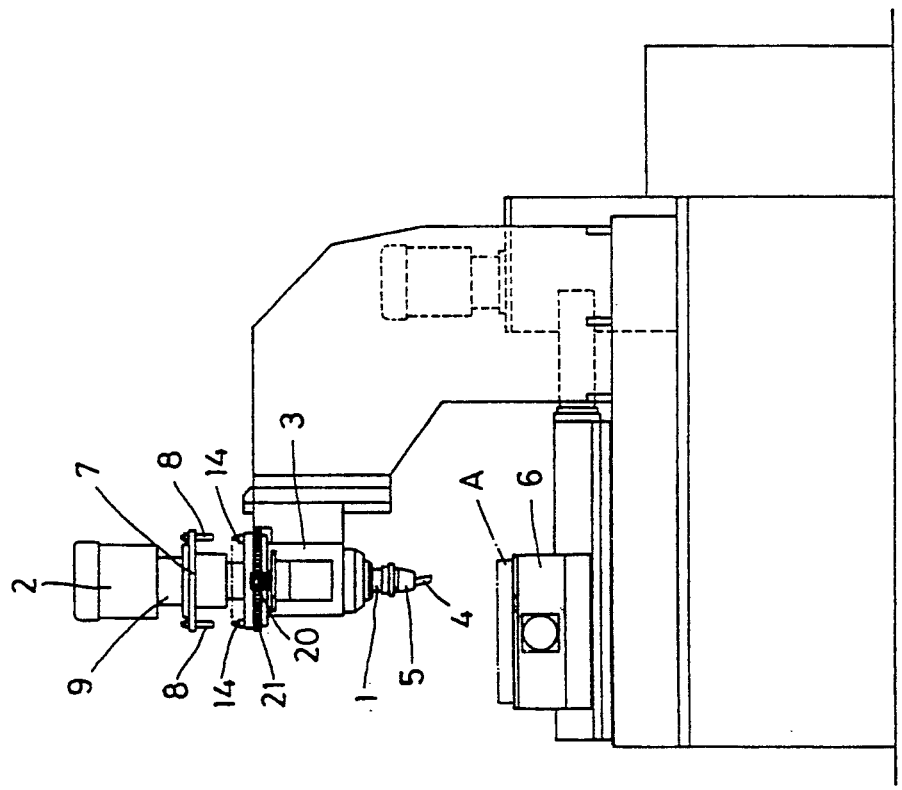

DEVICE FOR CHANGING STROKE OF CAULKING MACHINE

BACKGROUND OF THE INVENTION

This invention relates to a device for changing the downward stroke of a rivet head forming tool of a rivet head caulking machine.

In a prior art caulking machine, a rotary shaft is moved up and down within a predetermined stroke by actuating a cylinder to bring a forming shaft of a rivet head forming tool mounted on the bottom end of the rotary shaft into abutment with the end of a rivet shank at the end of the stroke. Thus a rivet head is formed.

Also, the up and down stroke of an anvil is adjustable according to the length of the rivet shank.

But if a plurality of rivet shanks having different lengths are provided on an article, it is necessary to repeat the operation of caulking a group of rivet shanks having equal lengths to one another and changing the anvil position to caulk another group of rivet shanks having equal lengths to one another. Otherwise it is necessary to use a plurality of caulking machines each for caulking a group of rivet shanks having equal lengths to one another. This is troublesome and extremely inefficient.

Japanese Unexamined Utility Model Publication 62-159940 shows a solution to this problem in which an article provided with rivet shanks of different lengths (protruding from the end faces of pins and extending through a plate) is placed on a table.

Then, the table is moved back and forth and side to side based on data inputted according to the positions of the first to last rivet shanks so that the rivet shanks will be brought right under the rivet head forming tool one after another.

On the other hand, an annular plate is driven by a drive unit. When a detector detects that pins having a length corresponding to that of the rivet shank to be caulked, i.e. adapted to restrict the downward stroke of the rivet head forming tool is located right under stopper pins, the annular plate is stopped.

When the rivet head forming tool is lowered together with the rotary shaft by a cylinder, the bottom ends of the stopper pins will abut the top ends of the pins, thus restricting the downward stroke of the rivet head forming tool. Thus, a forming surface of the forming shaft of the rivet head forming tool abuts the end of the rivet shank to form a rivet head.

When the detector detects that the pins for restricting the downward stroke of the rivet head forming tool are located right under the stopper pins while the annular plate is being driven by the drive unit (motor), the drive unit is deactivated to stop the annular plate. Thus, it was impossible to stop the stopper pins and the down stroke restrictor pins so that they will align with each other due to the inertia of the motor after it has been stopped.

Therefore, it was impossible to restrict the down stroke of the rivet head forming tool. This may result in the breakage of articles and rivet shanks.

SUMMARY OF THE INVENTION

It is an object of this invention to provide a device for changing the stroke of a rivet head forming tool which can automatically and precisely set the stroke of the rivet head forming tool according to the height of the rivet to be caulked.

In accordance with the present invention, there is provided a device for changing the stroke of a caulking machine, the caulking machine having a table on which is placed an article having a plurality of rivet shanks, and a rivet head forming tool, the table being adapted to be moved back and forth and right and left to bring the rivet shanks into the position right under the rivet head forming tool one after another the first one to the last one, the rivet head forming tool being driven by a motor and moved up and down by a cylinder to form a rivet head at the top of each rivet shank, the device comprising a plate member movable up and down together with the rivet head forming tool, stopper pins having their top ends secured to the plate member, an annular plate mounted outside a rotary shaft of the rivet head forming tool so as to be freely rotatable at a predetermined position, a plurality of pins having lengths corresponding to the lengths of the rivet shanks of the article and secured at equal intervals to the annular plate to extend upright, the pins being adapted to be brought into abutment at the top ends thereof with the bottom ends of the stopper pins to restrict the down stroke of the rivet head forming tool, and an indexing motor for driving the annular plate so that when the annular plate is brought to a stop, the stopper pins and the stroke restricting pins are in alignment with each other.

An article (which comprises a plate and a plurality of pins having their shanks protruding from their end faces and extending through the plate) is placed on the table.

Then, the rivet shanks are brought to the position right under the rivet head forming tool one after another by moving the table back and forth and right and left based on the input data on the positions of the first to last rivet shanks.

On the other hand, the annular plate is driven intermittently in one direction by the indexing motor at a pitch corresponding to the distance between the stroke restricting pins, so that when the annular plate is at a stop, the pins corresponding to the length of the rivet shank to be caulked, i.e. adapted to restrict the down stroke of the rivet head forming tool are located right under the stopper pins.

Then the cylinder is activated to lower the rivet head forming tool together with the rotary shaft. The stopper pins will come into abutment at their bottom ends with the top ends of the pins, thus restricting the down stroke of the rivet head forming tool. In this state, the forming surface of the forming shaft of the rivet head forming tool abuts the end of the rivet shank to form a rivet head.

According to the device for changing the stroke of the caulking machine of this invention, even when supplying rivet shanks of different lengths right under the rivet head forming tool, by positioning pins corresponding to the length of the rivet shank right under the stopper pins, the down stroke of the rivet head forming tool can be changed automatically. This serves to prevent breakage of articles and rivet shanks.

Also, since the annular plate is driven by the indexing motor, the annular plate can be stopped at a position where the stopper pins are precisely in alignment with the pins.

Other features and objects of the present invention will become apparent from the following description taken with reference to the accompanying drawings, in which:

BRIEF DESCRIPTION OF THE DRAWINGS

FIG. 1 is a side view of the caulking machine according to this invention;

FIG. 2 is a plan view of the same;

DETAILED DESCRIPTION OF THE PREFERRED EMBODIMENT

Figure 3:
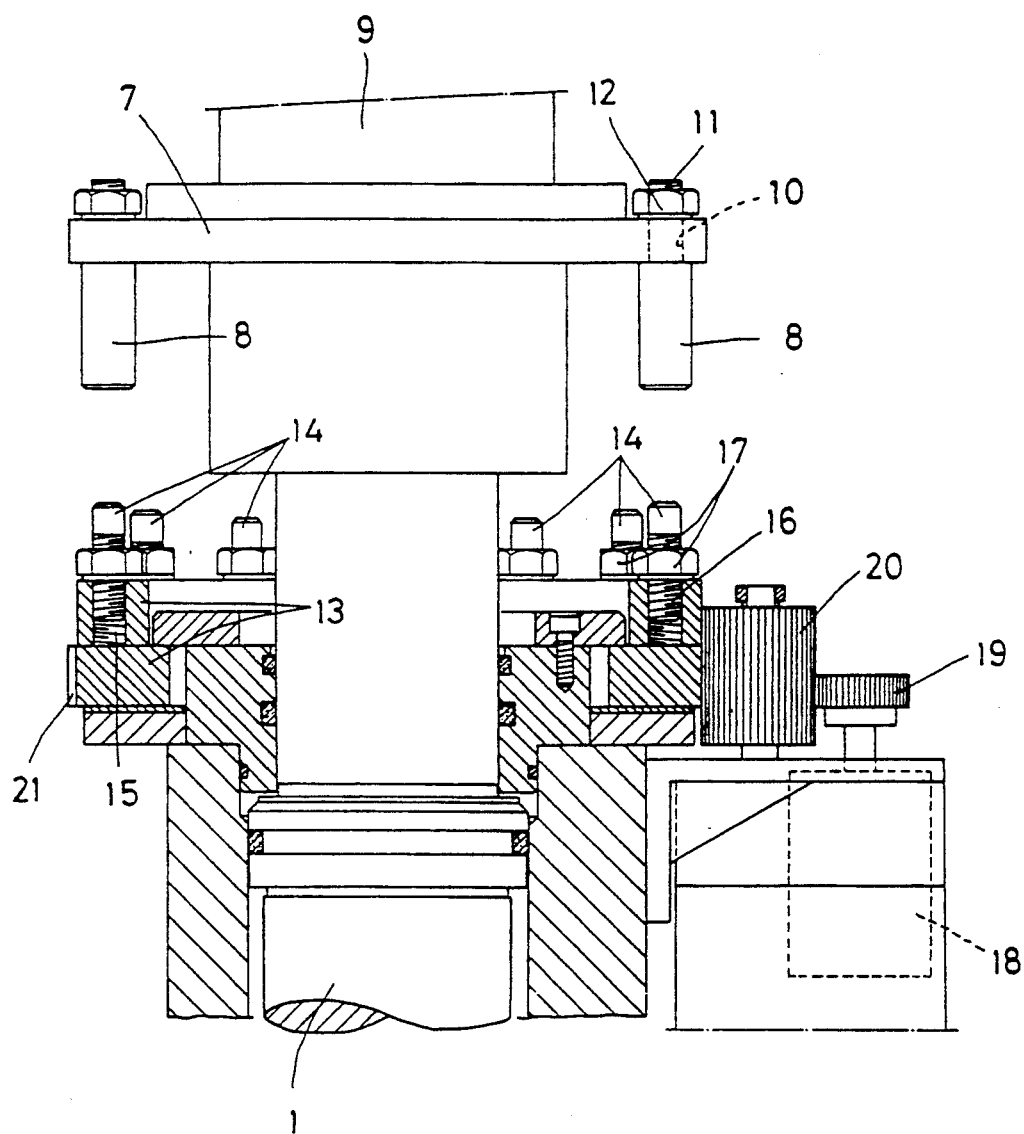
FIG. 3 is an enlarged vertical sectional front view of a portion of the same.
Figure 4:
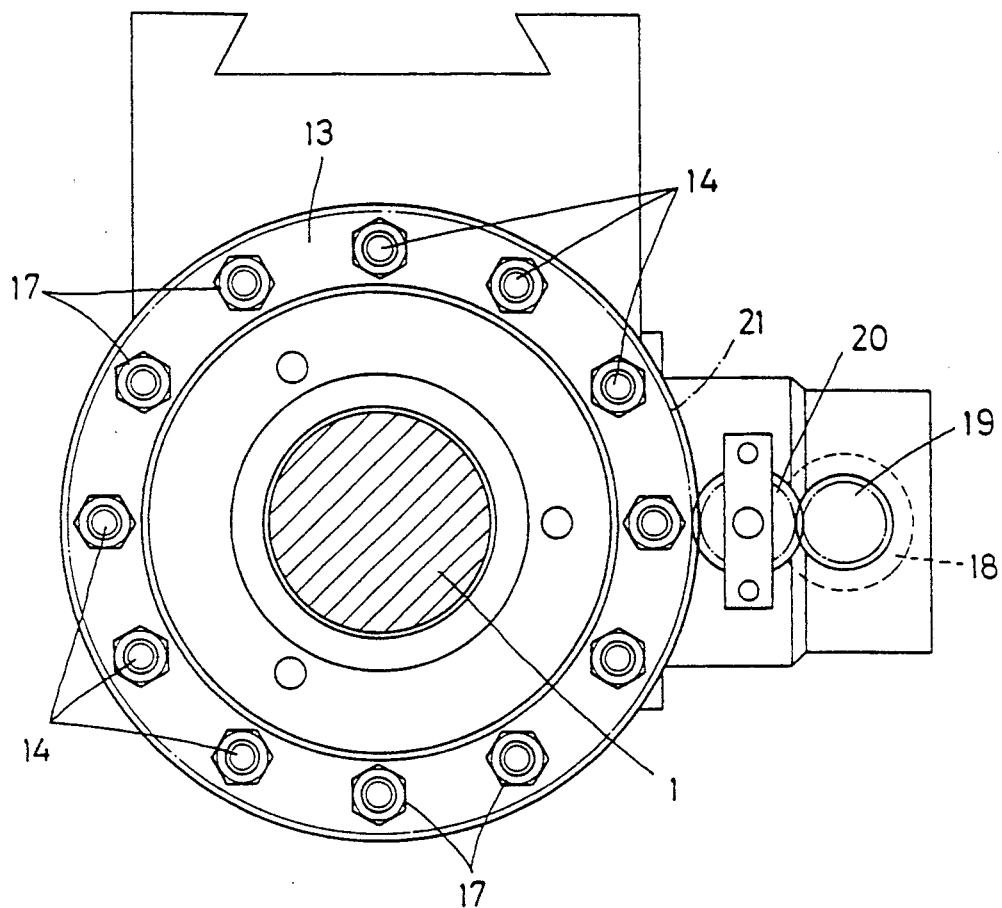
FIG. 4 is a cross-sectional plan view of the same.
Figure 5:
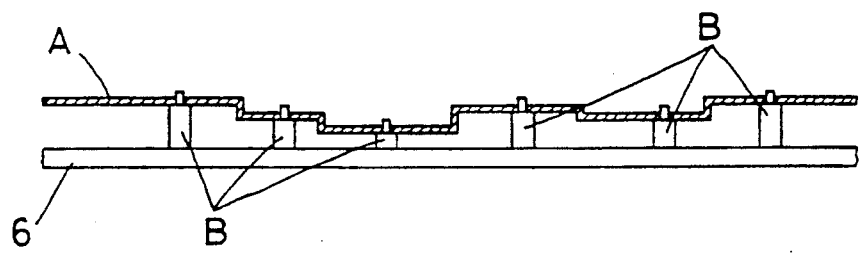
FIG. 5 is a front view of the rivet shanks set in position.

In the drawings, numeral 1 designates a rotary shaft driven by a motor 2 and moved up and down by a cylinder 3. The rotary shaft 1 is provided at its bottom end with a rivet head forming tool 5 adapted to rotate a forming shaft 4 with the center of its bottom forming surface located on the axis of the rotary shaft 1.

Although detailed illustration of the rivet head forming tool is omitted since it is well-known in the art, it comprises a base screwed into the bottom end of the rotary shaft 1 and formed with a hole extending from the bottom end thereof obliquely upwards, and a bearing secured in the hole to support the forming shaft 4.

Numeral 6 designates a table on which is placed an article A having rivet shanks B of different length attached thereto. The rivet shanks are moved right under the rivet head forming tool 5 one after another from the first one to the last one by moving the table back and forth and right and left (i.e. the method of driving the table in X-axis and Y-axis directions with a drive unit) based on the input data on the lengths of the shanks.

Numeral 7 designates a plate member adapted to move together with the rotary shaft 1 and not to rotate with respect to the rotary shaft 1. Stopper pins 8 has their top end secured to the plate member 7.

The plate member 7 is secured to a cylindrical body 9 mounted on the outer periphery of the rotary shaft 1 and having its top end secured to a piston of the cylinder 3 (not shown).

In the illustrated embodiment, the pins 8 have their upper threaded portions 11 inserted into holes 10 formed in the plate member 7 at both sides thereof and secured in position by threading nuts 12 onto the threaded portions 11.

Numeral 13 designates an annular plate mounted outside the rotary shaft 1 so as to be freely rotatable. Pins 14 of different heights are provided on the upper surface of the annular plate 13 at equal intervals. They are selectively brought into abutment with their top ends with the bottom ends of the stopper pins 8 according to the length of the rivet shank B to restrict the down stroke of the revet head forming tool 5.

The pins 14 are provided in the same number of pairs as the number of the rivet shanks B, with each pair arranged diametrically opposite to each other with respect to the center of the rotary shaft 1.

As shown in FIG. 3, the pins 14 have their threaded portions 16 threaded into a plurality of threaded holes 15 formed in the top surface of the annular plate over the entire circumference thereof at equal intervals. Locking nuts 17 threaded onto the threaded portions 16 are adjustably pressed against the top surface of the annular plate 13. But they may be mounted in any other way.

The annular plate 13 is driven intermittently (at a pitch corresponding to the distance between the pins 14) by an indexing motor 18 in one direction. When the annular plate 13 is at a stop, the stopper pins 8 and two of the pins 14 are in alignment with each other, thus restricting the down stroke of the river head forming tool 5.

Driving force is transmitted from the indexing motor 18 to the annular plate 13 through a gear 19 mounted on the output shaft of the indexing motor 18, an intermediate gear 20 in meshing engagement with the gear 19, and a toothed portion 21 provided over the entire peripheral surface of the annular plate 13 in meshing engagement with the intermediate gear 20.

What is claimed is:

1. A device for changing a stroke of a caulking machine, said machine including a table for receiving thereon an article having a plurality of rivet shanks, and a rivet head forming tool having a rotary shaft with a bottom portion operably coupled to said rivet head forming tool, said table being movable back and forth, and between right and left so as to place said rivet shanks into position substantially directly under said rivet head forming tool one after another from a first rivet shank to a last rivet shank, said rivet head forming tool being driven by a motor and being moved up or down by a cylinder so as to form a rivet head at a top portion of each of said rivet shanks, said device for changing a stroke of said caulking machine comprising:

a plate member which is movable up or down together with said rivet head forming tool;

stopper pins having top end portions thereof secured to said plate member;

an annular plate operably mounted outside of said rotary shaft of said rivet head forming tool, said annular plate being freely rotatable at a predetermined position;

a plurality of pins having lengths corresponding to lengths of said rivet shanks of said article and secured at equal intervals on said annular plate, said plurality of pins extending from said annular plate, wherein top end portions of said pins are brought onto abutment with bottom end portions of said stopper pins so as to restrict a down stroke of said rivet head forming tool; and an indexing motor for driving said annular plate so that when said annular plate is brought to a stop, said stopper pins and said stroke restricting pins are in alignment with each other.

2. The device for changing a stroke of a caulking machine as in claim 1, further comprising a gear means operably coupled to said indexing motor and said annular plate for allowing said indexing motor to rotate said annular plate.

3. The device for changing a stroke of a caulking machine as in claim 2, wherein said gear means includes a first gear operably coupled to said indexing motor, a toothed portion on a peripheral surface of said annular plate, and a second gear which meshes with said first gear and said toothed portion of said annular plate.

* * * * *